(12) United States Patent
Yamaguchi

(10) Patent No.: US 6,541,891 B2
(45) Date of Patent: Apr. 1, 2003

(54) ROTOR HAVING PRINTED WIRING COMMUTATOR MEMBER AND FLAT MOTOR HAVING THE ROTOR

(75) Inventor: Tadao Yamaguchi, Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 09/883,330

(22) Filed: Jun. 19, 2001

(65) Prior Publication Data

US 2002/0047464 A1 Apr. 25, 2002

(30) Foreign Application Priority Data

Jun. 19, 2000 (JP) ........................................ 2000-182521

(51) Int. Cl.$^7$ ............................................... H02K 1/22
(52) U.S. Cl. ........................................ 310/268; 310/81
(58) Field of Search ........................... 310/268, 81, 261; 29/596

(56) References Cited

U.S. PATENT DOCUMENTS

| 3,348,086 A | * | 10/1967 | Hiroshi | 310/154.05 |
|---|---|---|---|---|
| 4,390,805 A | * | 6/1983 | Hahn | 310/154.06 |
| 4,691,746 A | * | 9/1987 | Sedgewick | 140/92.1 |
| 4,859,890 A | * | 8/1989 | Sedgewick | 242/433 |
| 5,036,239 A | * | 7/1991 | Yamaguchi | 310/268 |
| 5,492,833 A | * | 2/1996 | Rodriguez et al. | 356/39 |
| 6,051,900 A | * | 4/2000 | Yamaguchi | 310/261 |

FOREIGN PATENT DOCUMENTS

| JP | 408163846 A | * | 6/1996 | |
|---|---|---|---|---|
| JP | 408331788 A | * | 12/1996 | |
| JP | 09037495 A | * | 2/1997 | H02K/3/26 |
| JP | 410052018 A | * | 2/1998 | |
| JP | 2000050601 A | * | 2/2000 | H02K/21/22 |

* cited by examiner

Primary Examiner—Joseph Waks
(74) Attorney, Agent, or Firm—Robert E. Bushnell, Esq.

(57) ABSTRACT

In a rotor having a printed wiring commutator member as a printed wiring board in which a shaft installation hole is installed at the center of a printed wiring board, at least six segment patterns separated by slits are formed around the shaft installation hole, and simultaneously, at least three conductive bodies connect every two other segment patterns, terminal connection patterns are arranged at the outer circumference of the printed wiring board, a printed wiring commutator member is formed, not by through hole plating, as a means for forming the at least three conductive bodies for connecting every two other segment patterns, a plurality of air-core armature coils are installed at the side opposite to the segment patterns, and terminals of the air-core armature coils are connected to the terminal connection patterns through notches arranged at the outer circumference.

8 Claims, 5 Drawing Sheets

US 6,541,891 B2

ROTOR HAVING PRINTED WIRING COMMUTATOR MEMBER AND FLAT MOTOR HAVING THE ROTOR

CLAIM OF PRIORITY

This application makes reference to, incorporates the same herein, and claims all benefits accruing under 35 U.S.C. §119 from my application ROTOR HAVING PRINTED WIRING COMMUTATOR MEMBER AND FLAT MOTOR HAVING THE ROTOR filed with the Japanese Patent Office on the 19$^{th}$ day of June 2000 and there duly assigned Serial No. 182521/2000.

BACKGROUND OF THE INVENTION

1. Field of the Invention

The present invention relates to a rotor, which has a printed wiring commutator member, used for audio apparatus such as a mini-disc player or an alarm in mobile communications apparatus, and more particularly, to a rotor having a printed wiring commutator member that does not require through hole plating so that production cost can be reduced, and to a flat motor incorporating the rotor.

2. Description of the Related Art

In a conventional printed wiring commutator for a flat coreless motor, six segment patterns are separated by slits on the front side of a printed wiring board. Simultaneously, opposite segments of the six segments are electrically connected on the rear side of the printed wiring board by through hole plating and a plurality of air-core coils are further arranged on the rear side of the printed wiring board. The printed wiring commutator member is integrally formed of resin.

Printed wiring commutators that have patterns formed on both sides of a printed circuit board coupled via through holes are widely used since the design of the commutator member is very easy. Additional work however, such as punching the printed wiring board, processing the through holes with a process such as a copper plating process, or resist processing for insulation when the coil is arranged, is required and production cost is increased correspondingly.

SUMMARY OF THE INVENTION

Accordingly, it is an object of the present invention to provide an improved rotor.

It is another object to provide a rotor bearing a plurality of segments of a pattern formed on a printed wiring commutator member that are electrically coupled together without plated through holes.

It is still another object to a rotor bearing a plurality of electrically connected segments of a pattern that is amenable to lower production costs.

To achieve these and other objects, there is provided a rotor having a printed wiring commutator formed on a printed wiring board that has a shaft installation hole located at the center of a printed wiring board. At least six segment patterns electrically separated by slits are formed around the shaft installation hole, and simultaneously, at least three electrical conductors connect every two segment patterns. Terminal connection patterns are arranged at the outer circumference of the printed wiring board, and a printed wiring commutator member is formed, not by through hole plating, to provide at least three of the electrical conductors in order to connect pairs of the segmented patterns. A plurality of air-core armature coils are installed on the side of the wiring board opposite to the segmented patterns, and terminals of the air-core armature coils are connected to the terminal connection patterns through notches disposed along the outer circumference.

It is preferred in embodiments of the present invention that at least one of the three electrical conductors be formed as a terminal of the air-core armature coil.

Also, it is preferred that part of a spark quenching printed resistor be located at part of the conductive body configured as the terminal to cover the conductive body.

Additionally, it is preferred that a plurality of resin passing holes be installed at the outer circumference of any array of the segmented patterns.

A flat motor having a rotor with this structure and a printed wiring commutator is provided wherein vibrations are generated during rotation by constructing the rotor to be non-circular and the motor to be formed of a magnet disposed to face the rotor via an axial gap and a housing accommodates the rotor and magnet, or alternatively a flat motor is constructed to use this rotor with a printed wiring commutator wherein the rotor is formed to be circular and the motor is formed of a magnet disposed to face the rotor via an axial gap, and a housing accommodates the rotor and magnet. It is preferred that the position of the patterns that form the terminal connection pattern on the rotor be located more radially outward than the outer circumference of the magnet.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein:

FIG. 2A is a plan view showing the major portions of an eccentric, non-circular rotor having a one-sided printed wiring commutator to be used for a flat, coreless vibration motor constructed as a first embodiment of the present invention, while

FIG. 4A is a plan view showing the major portions of a modified example of the rotor illustrated by FIG. 2, while FIG. 5A is a plan view showing the major portions of a circular rotor using a one-sided printed wiring commutator for a conventional rotation type coreless motor constructed as a second embodiment of the present invention, while

DETAILED DESCRIPTION OF THE INVENTION

Figure 1:
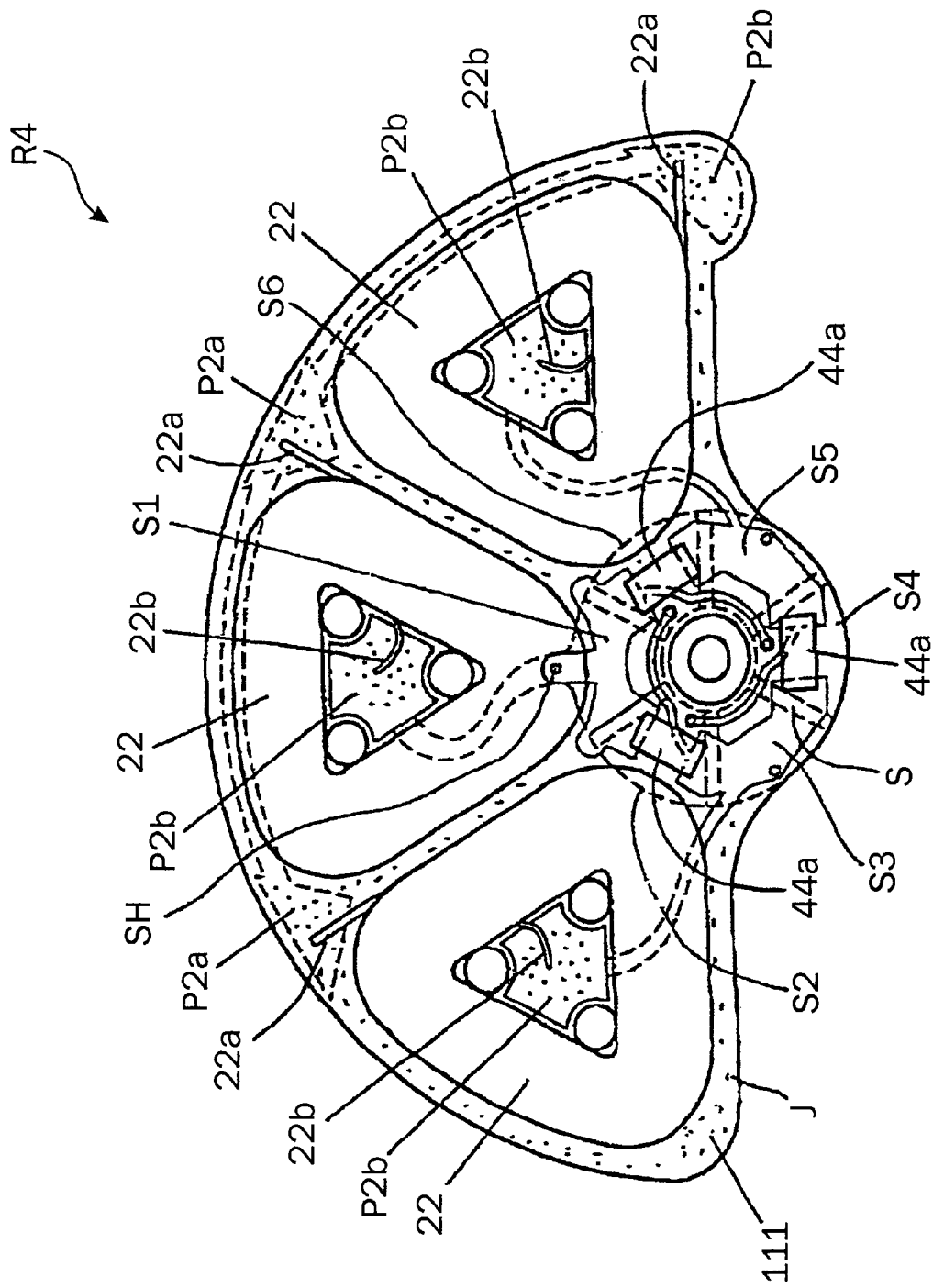
FIG. 1 is a plan view showing the major portions of an eccentric non-circular rotor using a conventional printed wiring commutator.

Turning now to the drawings, as is shown in FIG. 1, a printed wiring commutator for a flat coreless motor used as a vibration source for an alarm of a mobile communication apparatus, has six segment patterns (S1 through S6) plated with noble metals such as gold or a gold alloy, that are separated by slits S on the front side (an upper side in the drawing) of a glass cross epoxy resin double-sided printed wiring board 111 having a thickness of about 0.2 mm. Sliding segment patterns that are opposite to each other are electrically connected through six through-holes SH identically plated with noble metals. Spark quenching devices 44a are formed of printed resistors, and simultaneously, three air-core coils 22 are eccentrically arranged on the rear side of the printed wiring board 111. Terminals 22a and 22b which are connected to predetermined patterns P2a and P2b by soldering, and simultaneously, the rotor R1, including the. spark quenching devices 44a, is integrally formed of heat-resisting resin J having a low frictional coefficient, with a spread fan shape. Here, the resin itself with its low frictional coefficient, serves as a bearing.

Referring now to FIG. 2, a rotor R1 having a printed wiring commutator constructed according to the principles of the present invention has an eccentric non-circular shape (or a spread fan shape). The printed wiring commutator forming the rotor R1 has a shaft installation hole 1a formed at the center of a printed wiring board 1 that has a thickness of about 0.2 mm. Six segment patterns S1 through S6 plated with noble metal such as gold and gold alloy are formed as sectors of a circular array, with the segment pattern radially separated by slits S, centered around the shaft installation hole 1a. Simultaneously, modified resin through holes 1d connected to form a resin guide 1c indicated by a dotted line, are installed by a press process so that three resin through holes 1b and two air-core armature coils to be described later can be formed on the rear surface of the printed wiring board 1 and around the segment patterns S1–S6.

At the resin through holes 1b, part 3a of the same resin slightly protrudes through the resin holes 1b to partially surround the respective segment patterns S1, S3, and S5. Although the resin through holes 1b secure strength, the resin through holes 1b are not drill processed and plated, but formed in a typical press process to reduce a cost. In order for rotation to occur, the segment patterns which are opposite each other and separated on either side of wiring board 1 need to be electrically connected. To provide for electrical connection, conductive patterns lead radially inward from the segment patterns S3 and S6 and are connected together circumferentially around the shaft installation hole 1a. Conductive patterns, including conductive pattern Sc, from the segment patterns S2 and S5 extend radially outward toward the leftmost outer circumference portion in FIG. 2A to be electrically connected together, and the segment pattern S4 is extended radially outward in the same way to form conductive pattern Sa to be connected to segment pattern S1. A wire connection pattern Sb is formed at the end of a conductive pattern extending from the segment pattern S1. A notch b is formed along the circumferential perimeter of wiring board 1, at the wire connection pattern Sb, to accommodate electrical leads e. Conductive patterns are extended from the segment patterns S5 and S6 toward the right side to be connected to wire connection patterns Sc and Sd arranged at the outer circumference of wiring board 1. Notches c and d are installed at the wire connection patterns Sc and Sd as latch detents. Initial terminals 2a and 2b of two air-core armature coils 2A and 2B indicated by dotted lines and attached at the rear side of wiring board 1 (i.e., on the side of wiring board 1 opposite from the segment patterns S1–S6) are latched by the notches c and d and are respectively connected to wire connection patterns Sc, Sd by soldering. FIG. 2B is a left side view of the rotor shown in FIG. 2A for better understanding of FIG. 2A.

Winding end terminals e, f of the air-core armature coils 2A and 2B are extended, latched at the left notch b, and connected to the wire connection pattern Sb by soldering. The ends of the winding end terminals e are soldered to the wire connection pattern Sa in the same way so that these terminals e become jumper wires.

Some terminals of the respective coils have been omitted in order to maintain clarity. A spark quenching printed resistor r1 is installed to prevent the terminals e used as the jumper wires from directly contacting the conductive patterns which connect the segment patterns S2 and S5. Also, a spark quenching printed resistor r2 is formed between the conductive patterns of the segment patterns S1, S6 and S5. That is, since the spark quenching printed resistor r1 is formed under the winding end terminals e and f, as shown in FIG. 2B, the printed pattern which shorts-circuits facing segments is separated from the terminals e and f as function as a jumper wire.

In the printed wiring commutator member having the above structure, around a shaft installation hole 1a at the center, a resin bearing 3 and an arcuate weight portion 4 for enabling greater movement of the center of gravity are integrally formed of heat-resistant, highly slippery resin having a low frictional coefficient and a specific gravity of about 4 and of the same resin at the arc side of the rotor, respectively. The resin bearing 3 is integrally formed with the printed wiring commutator member 1 such that part 3a of the same resin can be inserted in and pass through the shaft installation hole 1a. The resin bearing 3 can secure sufficient strength by a ring type bank portion 3aa formed to be greater than the resin through hole 1a disposed at the center.

Also, in order to connect each terminal of the air-core armature coils 2A and 2B to the wire connection patterns Sa, Sb, Sc and Sd by soldering, the terminals are preferably accommodated within thickness of the arcuate weight portion 4.

Also, when the printed wiring board 1 is thin, a thin copper plate is preferably left on the surface of the printed wiring board 1 to avoid deformation such as warping and to guarantee strength.

Also, the rotors are commonly used by being separated from a connection E for mass-production.

Figure 3:
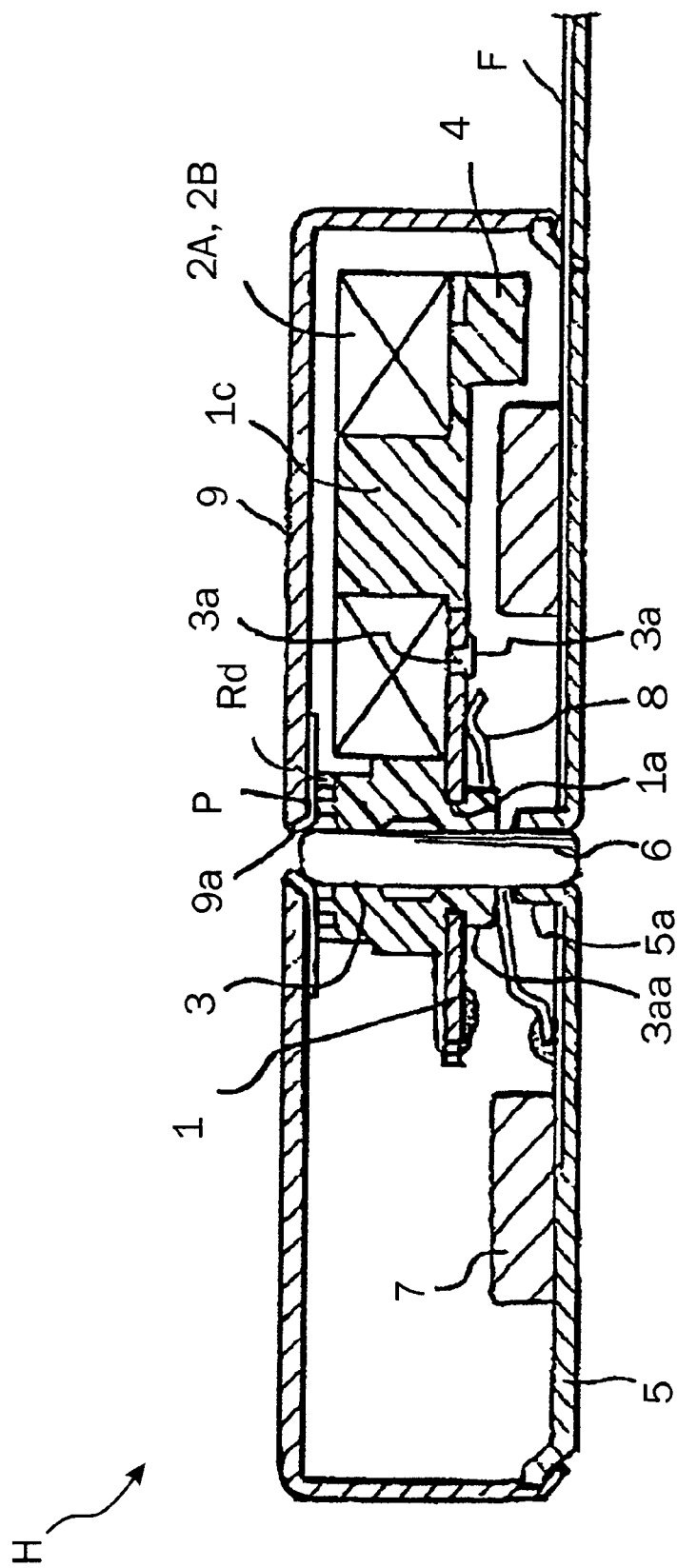
FIG. 3 is a sectional view showing the major portions of a motor using the rotor illustrated by FIG. 2.

A shaft fixed type flat coreless vibration motor using the above eccentric rotor R1 is shown in FIG. 3. That is, one end of a thin stainless shaft 6 is pressed to be fixedly inserted in a shaft holder 5a which is integrally raised at the center of a bracket 5 forming part of a housing H. The eccentric rotor R1 is rotatably installed at a free end of the shaft 6. A ring type magnet 7 formed of neodymium and facing the eccentric rotor R1 though a gap has four field pole NS which are alternately magnetized and an outer diameter which is sufficiently small so as not to contact the arcuate weight portion 4, and is fixed to the bracket 5. A pair of brushes 8 (although only one brush is shown in the drawing) are installed on a feeder sheet F around the shaft holder 5a on the bracket 5 and at the inner side of the ring type magnet 7. The brushes 8 press and contact the segment patterns at a sliding contact angle of 90°. A tapered through-hole 9a through which the other end of the thin stainless shaft 6 is installed is arranged at the center of a case 9 accommodating the eccentric rotor R1. A polyester film P which is arranged around the resin through-hole 9a and a bank portion Rd of the eccentric rotor R1 slides and contacts the rotor case 9 via the polyester film P.

Accordingly, since the eccentric rotor R1 is always elastically pressed toward the case 9 by the brushes 8 and rotatably pressed by the polyester film P, the eccentric rotor R1 is prevented from moving toward the bracket 5 and contacting it. Also, since a gap between the eccentric rotor R1 and a ceiling portion of the case 9 is always maintained to be uniform, the position of rotation is maintained to be constant so that rotation can be stably supported.

Figure 4A:
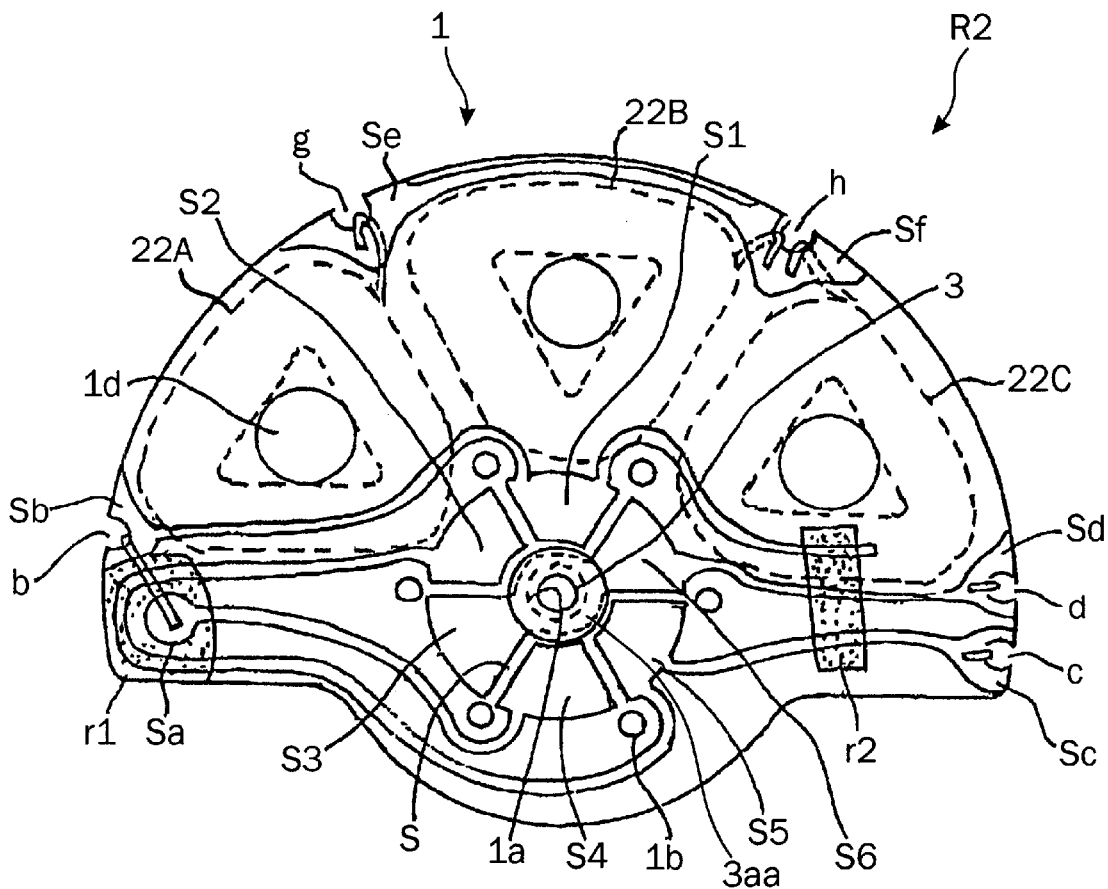

Although in the above the eccentric rotor R1 has two air-core armature coils in which one of three phases is open, a rotor R2 may have a conventional three air-core armature coils 22A, 22B and 22C as shown in FIG. 4A.

In a three-coil star connection method as described in this embodiment, any one of a winding initiation or a winding termination (applied in the present embodiment) of the armature coil must be collectively connected so as not to connect any one of the segments. Thus, collective wire connection patterns Se and Sf are installed at the weight center movement side and a winding termination terminal of each of the air-core armature coils 22A, 22B and 22C is led from the rear side through two notches g and h and connected by soldering to the collective wire connection patterns Se and Sf, without being connected to any one of the segments.

Figure 2A:
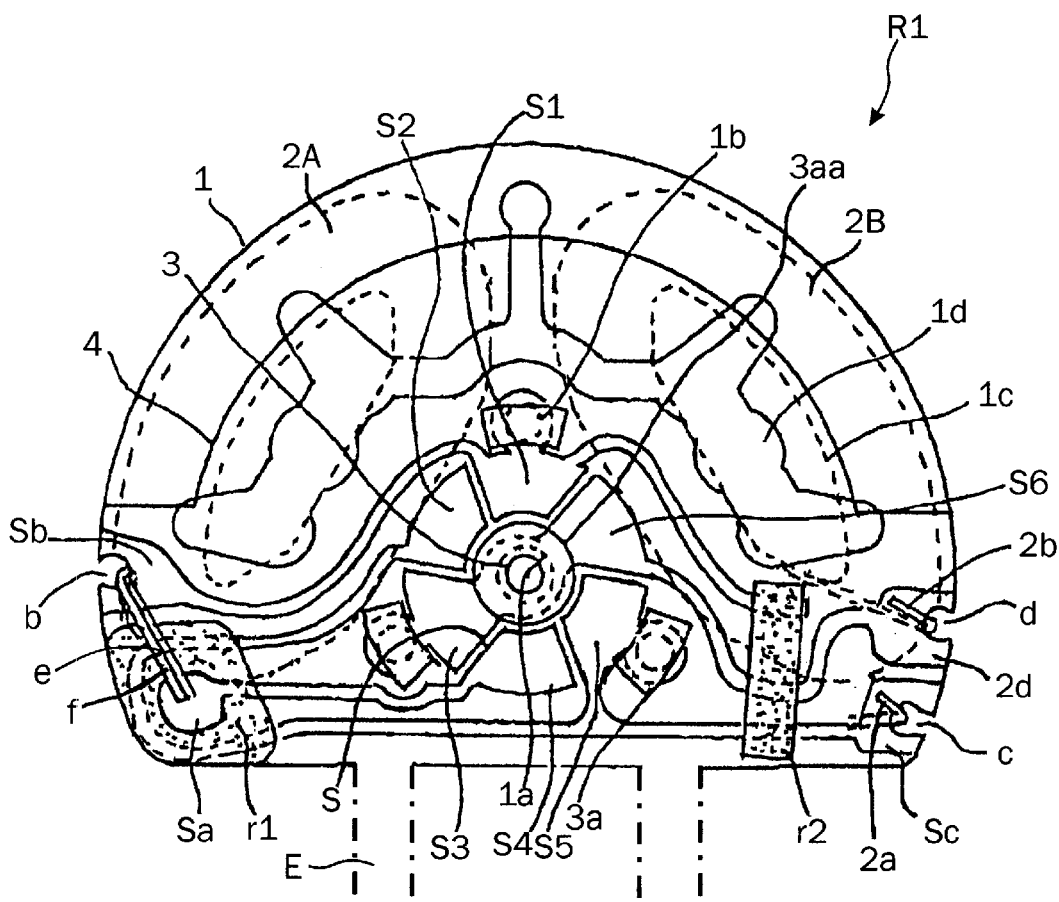
Figure 2B:
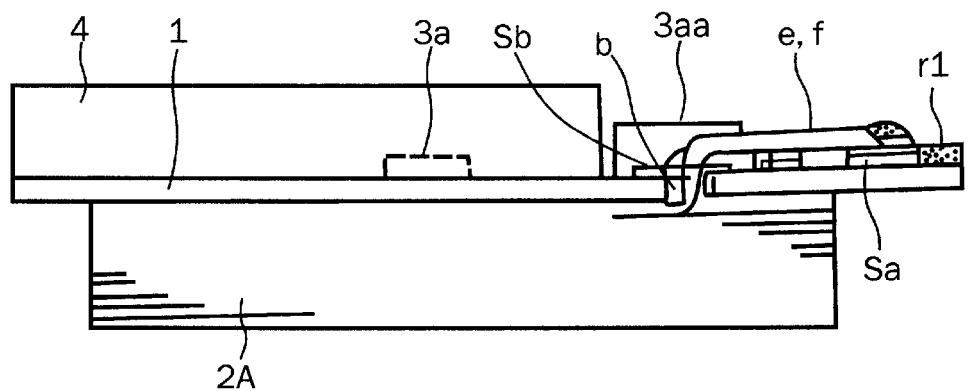
FIG. 2B is a left side view of the rotor shown in FIG 2A.

Also, since each of the winding initiation terminals is processed as shown in FIGS. 2A and 2B, a description thereof will be omitted. Elements having the same functions as those shown in FIGS. 2, 2B and 3 are indicated by the same reference numerals and descriptions thereof will be omitted.

Figure 4B:
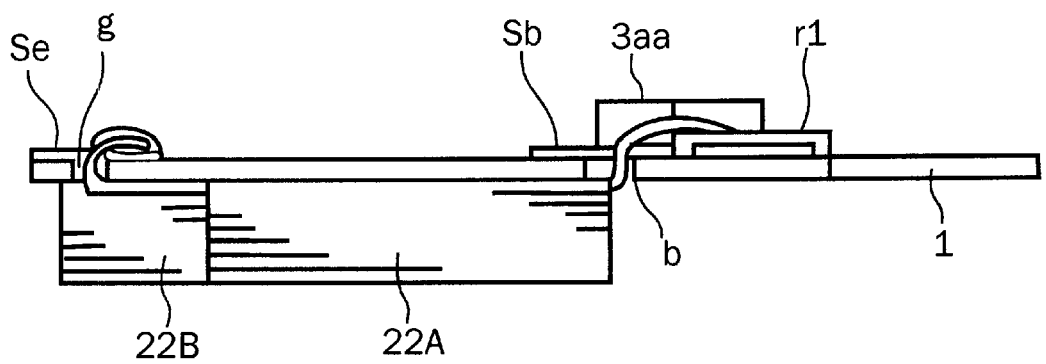
FIG. 4B is a left side view of FIG. 4A.
Figure 5A:
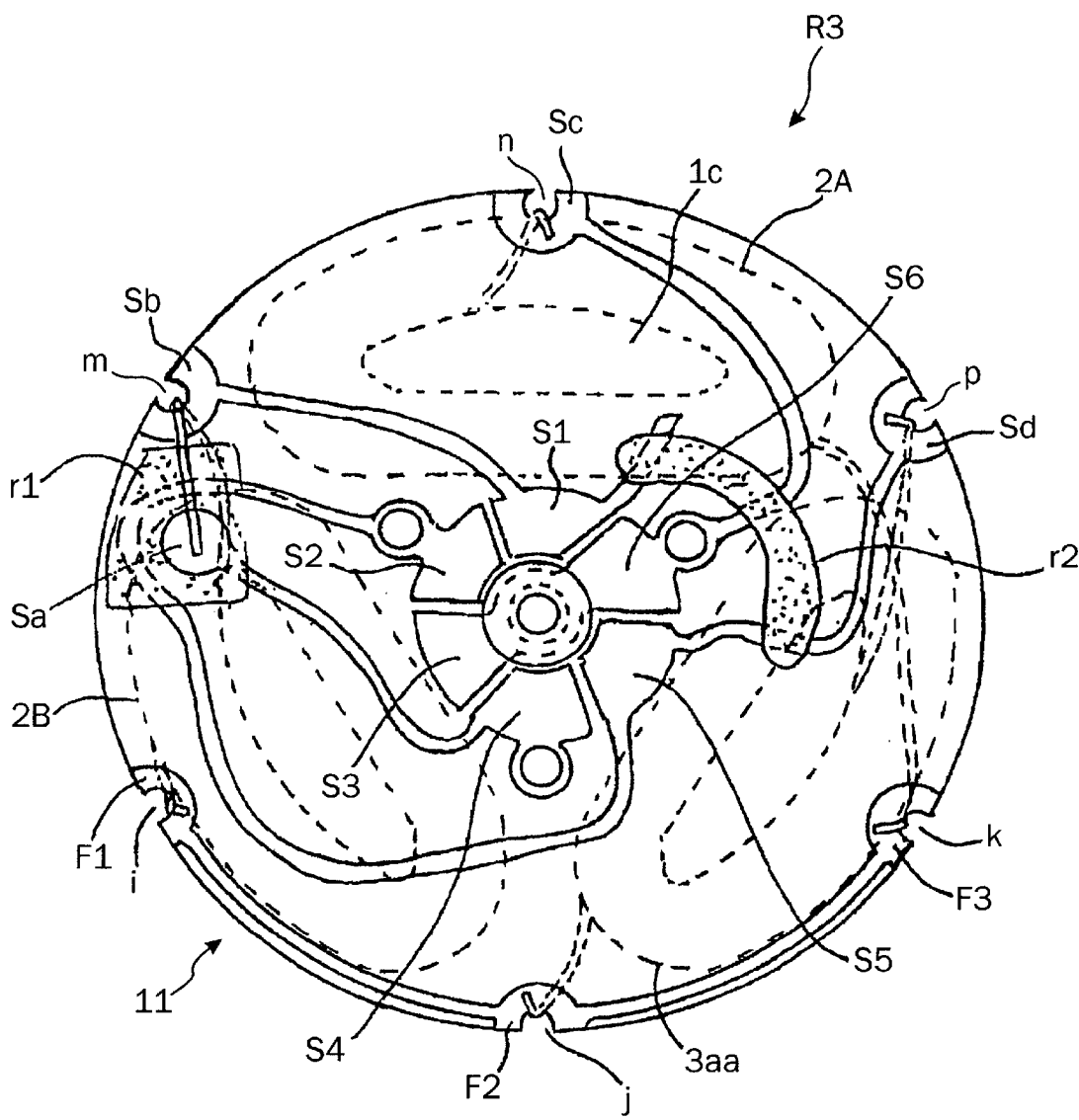
Figure 5B:
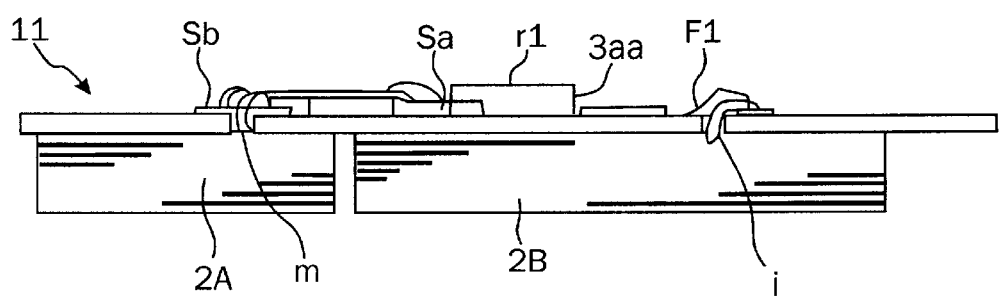
FIG. 5B is a left side view of FIG. 5A.

Although the vibration motor having an eccentric rotor is described above, as shown in FIG. 5A, a rotor R3 having a conventional rotary disc type printed wiring commutator can be used in which three air-core armature coils 2A, 2B and 2C are circumferentially arranged 120° aprat from each other To configure the rotor R3 without plating the through holes, no basic change is made to the rotor of FIG. 2A. However, in the three-coil star connection method as in the modified example of FIGS. 4A and 4B, any one of the winding initiation terminal or winding termination terminal (applied to the present embodiment) is collectively connected, and there is a need to prevent the terminal from being connected to any segment. That is, each of the winding termination terminals of the air-core coils 2A, 2B and 2C is latched at the notches I, j and k from the rear side and connected by soldering,to common wire connection patterns F1, F2 and F3 connected to one another.

Each of winding initiation terminals is processed by latching the terminals drawn from the rear side by the notches n, m, and p. Terminals of air-core armature colis 2B, 2A and 2C are respectively connected to the front wire connection patterns Sb, Sc, and Sd by being soldered.

Also, although the terminals are used as the jumper devices to reduce the cost in the is above embodiments, "0" ohm chip resistance devices may be used at the same position instead.

Also, although the air-core armature coils are described to be installed from the rear side in the above embodiments, the air-core armature coils are mounted on the printed wiring communicator members 1 and 11 by using a guide and the resin bearing 3 and the weight portion 4 may be integrally formed with heat-resistant, highly slippery resin having a specific gravity of 4 after the terminals are connected.

Also, although the commutator having six segments is described in the above embodiments, a commutator having nine segments as shown in Japanese Patent Publication No. 9-294352, a combined six-pole magnet and brushes having a sliding-contact open angle of 180°, or 2 through 4 air-core armatures coil type which is not three-phase, may be adopted.

Also, although the segments are plated with noble metals (gold or gold alloy) and directly sliding-contact the brushes as described above, the segment may be a thin copper plate and separately connected to a cylindrical commutator. As an available printed wiring board, not only a one-sided substrate but also a double-sided substrate in which a through hole is not formed by drill-processing and is not gold plated may be used if the through hole process is not needed.

It is noted that the present invention is not limited to the preferred embodiment described above, and it is apparent that variations and modifications by those skilled in the art can be effected within the spirit and scope of the present invention defined in the appended claims.

As described above, according to the present invention, the printed wiring commutator member having at least six segments can be configured without metal plating the through holes. Also, the through hole processing by drill-processing and through hole plating processes are not necessary. Further, since a insulating resist process is not needed during coil installation, a rotor and a flat motor having the rotor can be provided at a low cost.

What is claimed is:

1. A rotor having a printed wiring commutator member as a printed wiring board in which a shaft installation hole is installed at the center of said printed wiring board, at least six segment patterns separated by slits are formed around the shaft installation hole, and simultaneously, at least three conductive bodies connect every two other of said segment patterns, wherein terminal connection patterns are arranged at the outer circumference of the printed wiring board, a printed wiring commutator member is formed, not by through hole plating, as a means for forming the at least three conductive bodies for connecting said every two other segment patterns, a plurality of air-core armature coils are installed at the side opposite to the segment patterns, and terminals of the air-core armature coils are connected to the terminal connection patterns through notches arranged at the outer circumference of the printed wiring board.

2. The rotor as claimed in claim 1, wherein at least one of the three conductive bodies is formed as a terminal of the air-core armature coil.

3. The rotor as claimed in claim 2, wherein part of a spark quenching printed resistor also functioning as a resist is arranged at a part of the conductive body configured as the terminal to cover the conductive body.

4. The rotor as claimed in claim 1, wherein a plurality of resin passing holes are installed at the out side of the segment patterns.

5. A flat motor having a rotor having a printed wiring commutator member wherein vibrations are generated during rotation by forming the rotor to be non-circular and the motor is formed of a magnet disposed to face the rotor via an axial gap and a housing accommodating the rotor and magnet, the rotor having a printed wiring commutator member as a printed wiring board in which a shaft installation hole is installed at the center of said printed wiring board, at least six segment patterns separated by slits are formed around the shaft installation hole, and simultaneously, at least three conductive bodies connect every two other of said segment patterns, terminal connection patterns are arranged at the outer circumference of the printed wiring board, a printed wiring commutator member is formed, not by through hole plating, as a means for forming the at least three conductive bodies for connecting said every two other segment patterns, a plurality of air-core armature coils are installed at the side opposite to the segment patterns, and terminals of the air-core armature coils are connected to the terminal connection patterns through notches arranged at the outer circumference of the printed wiring board.

6. The motor as claimed in claim 5, wherein the position of the terminal connection pattern portion of the rotor is outer than the outer circumference of the magnet.

7. A flat motor having a rotor having a printed wiring commutator member wherein the rotor is formed to be circular and the motor is formed of a magnet disposed to face the rotor via an axial gap and a housing accommodating the rotor and the magnet, the rotor having a printed wiring commutator member as a printed wiring board in which a shaft installation hole is installed at the center of said printed wiring board, at least six segment patterns separated by slits are formed around the shaft installation hole, and simultaneously, at least three conductive bodies connect every two other of said segment patterns, terminal connection patterns are arranged at the outer circumference of the printed wiring board, a printed wiring commutator member is formed, not by through hole plating, as a means for forming the at least three conductive bodies for connecting said every two other segment patterns, a plurality of air-core armature coils are installed at the side opposite to the segment patterns, and terminals of the air-core armature coils are connected to the terminal connection patterns through notches arranged at the outer circumference the printed wiring board.

8. The motor as claimed in claim 6, wherein the position of the terminal connection pattern portion of the rotor is outer than the outer circumference of the magnet.

* * * * *